United States Patent
Boerjesson

(10) Patent No.: US 9,001,666 B2
(45) Date of Patent: Apr. 7, 2015

(54) SYSTEM AND METHOD FOR IMPROVING ROUTING IN A DISTRIBUTED COMMUNICATION PLATFORM

(71) Applicant: Twilio, Inc., San Francisco, CA (US)

(72) Inventor: Jonas Boerjesson, San Francisco, CA (US)

(73) Assignee: Twilio, Inc., San Francisco, CA (US)

(*) Notice: Subject to any disclaimer, the term of this patent is extended or adjusted under 35 U.S.C. 154(b) by 0 days.

(21) Appl. No.: 14/209,152

(22) Filed: Mar. 13, 2014

(65) Prior Publication Data

US 2014/0269333 A1    Sep. 18, 2014

Related U.S. Application Data

(60) Provisional application No. 61/791,800, filed on Mar. 15, 2013.

(51) Int. Cl.
    *H04L 12/721* (2013.01)
    *H04L 12/28* (2006.01)

(52) U.S. Cl.
    CPC .................... *H04L 45/123* (2013.01)

(58) Field of Classification Search
    CPC ......... H04L 45/12; H04L 45/22; H04L 45/28; H04L 45/123; H04L 45/52
    USPC ........................................................ 370/238
    See application file for complete search history.

(56) References Cited

U.S. PATENT DOCUMENTS

| | | | |
|---|---|---|---|
| 5,274,700 A | 12/1993 | Gechter et al. | |
| 5,526,416 A | 6/1996 | Dezonno et al. | |
| 5,581,608 A | 12/1996 | Jreij et al. | |
| 5,598,457 A | 1/1997 | Foladare et al. | |
| 6,026,440 A | 2/2000 | Shrader et al. | |
| 6,094,681 A | 7/2000 | Shaffer et al. | |
| 6,138,143 A | 10/2000 | Gigliotti et al. | |
| 6,185,565 B1 | 2/2001 | Meubus et al. | |
| 6,192,123 B1 | 2/2001 | Grunsted et al. | |
| 6,223,287 B1 | 4/2001 | Douglas et al. | |
| 6,269,336 B1 | 7/2001 | Ladd et al. | |
| 6,373,836 B1 | 4/2002 | Deryugin et al. | |

(Continued)

FOREIGN PATENT DOCUMENTS

| DE | 1684587 A | 3/1971 |
|---|---|---|
| EP | 0282126 A | 9/1988 |

(Continued)

OTHER PUBLICATIONS

Complaint for Patent Infringement, *Telinit Technologies, LLC* v. *Twilio Inc.*, dated Oct. 12, 2012.

*Primary Examiner* — Andrew Lai
*Assistant Examiner* — Albert Shih
(74) *Attorney, Agent, or Firm* — Jeffrey Schox

(57) ABSTRACT

A system and method for routing communication in a communication platform that includes generating edge cost scores in the communication network; assigning distribution values within the network; setting a score tolerance; receiving a communication directive; performing network graph search to identify a selected route through a route selection process including considering cost score within the score tolerance and distributing selection of a route associated with the communication directive in accordance to the distribution values; and establishing a media route specified by the selected route.

21 Claims, 15 Drawing Sheets

(56) References Cited

U.S. PATENT DOCUMENTS

| | | | |
|---|---|---|---|
| 6,425,012 B1 | 7/2002 | Trovato et al. | |
| 6,430,175 B1 | 8/2002 | Echols et al. | |
| 6,434,528 B1 | 8/2002 | Sanders | |
| 6,445,694 B1 | 9/2002 | Swartz | |
| 6,445,776 B1 | 9/2002 | Shank et al. | |
| 6,459,913 B2 | 10/2002 | Cloutier | |
| 6,493,558 B1 | 12/2002 | Bernhart et al. | |
| 6,496,500 B2 | 12/2002 | Nance et al. | |
| 6,501,832 B1 | 12/2002 | Saylor et al. | |
| 6,507,875 B1 | 1/2003 | Mellen-Garnett et al. | |
| 6,600,736 B1 | 7/2003 | Ball et al. | |
| 6,606,596 B1 | 8/2003 | Zirngibl et al. | |
| 6,614,783 B1 | 9/2003 | Sonesh et al. | |
| 6,625,258 B1 | 9/2003 | Ram et al. | |
| 6,625,576 B2 | 9/2003 | Kochanski et al. | |
| 6,636,504 B1 | 10/2003 | Albers et al. | |
| 6,662,231 B1 | 12/2003 | Drosset et al. | |
| 6,704,785 B1 | 3/2004 | Koo et al. | |
| 6,707,889 B1 | 3/2004 | Saylor et al. | |
| 6,711,249 B2 | 3/2004 | Weissman et al. | |
| 6,738,738 B2 | 5/2004 | Henton | |
| 6,757,365 B1 | 6/2004 | Bogard | |
| 6,765,997 B1 | 7/2004 | Zirngibl et al. | |
| 6,768,788 B1 | 7/2004 | Langseth et al. | |
| 6,778,653 B1 | 8/2004 | Kallas et al. | |
| 6,785,266 B2 | 8/2004 | Swartz | |
| 6,788,768 B1 | 9/2004 | Saylor et al. | |
| 6,792,086 B1 | 9/2004 | Saylor et al. | |
| 6,798,867 B1 | 9/2004 | Zirngibl et al. | |
| 6,807,529 B2 | 10/2004 | Johnson et al. | |
| 6,807,574 B1 | 10/2004 | Partovi et al. | |
| 6,819,667 B1 | 11/2004 | Brusilovsky et al. | |
| 6,829,334 B1 | 12/2004 | Zirngibl et al. | |
| 6,834,265 B2 | 12/2004 | Balasuriya | |
| 6,836,537 B1 | 12/2004 | Zirngibl et al. | |
| 6,842,767 B1 | 1/2005 | Partovi et al. | |
| 6,850,603 B1 | 2/2005 | Eberle et al. | |
| 6,870,830 B1 | 3/2005 | Schuster et al. | |
| 6,873,952 B1 | 3/2005 | Bailey et al. | |
| 6,874,084 B1 | 3/2005 | Dobner et al. | |
| 6,885,737 B1 | 4/2005 | Gao et al. | |
| 6,888,929 B1 | 5/2005 | Saylor et al. | |
| 6,895,084 B1 | 5/2005 | Saylor et al. | |
| 6,898,567 B2 | 5/2005 | Balasuriya | |
| 6,912,581 B2 | 6/2005 | Johnson et al. | |
| 6,922,411 B1 | 7/2005 | Taylor | |
| 6,931,405 B2 | 8/2005 | El-Shimi et al. | |
| 6,937,699 B1 | 8/2005 | Schuster et al. | |
| 6,940,953 B1 | 9/2005 | Eberle et al. | |
| 6,941,268 B1 | 9/2005 | Porter et al. | |
| 6,947,417 B2 | 9/2005 | Laursen et al. | |
| 6,947,988 B1 | 9/2005 | Saleh | |
| 6,961,330 B1 | 11/2005 | Cattan et al. | |
| 6,964,012 B1 | 11/2005 | Zirngibl et al. | |
| 6,970,915 B1 | 11/2005 | Partovi et al. | |
| 6,977,992 B2 | 12/2005 | Zirngibl et al. | |
| 6,985,862 B2 | 1/2006 | Stroem et al. | |
| 7,003,464 B2 | 2/2006 | Ferrans et al. | |
| 7,006,606 B1 | 2/2006 | Cohen et al. | |
| 7,010,586 B1 | 3/2006 | Allavarpu et al. | |
| 7,020,685 B1 | 3/2006 | Chen et al. | |
| 7,039,165 B1 | 5/2006 | Saylor et al. | |
| 7,062,709 B2 | 6/2006 | Cheung | |
| 7,076,037 B1 | 7/2006 | Gonen et al. | |
| 7,076,428 B2 | 7/2006 | Anastasakos et al. | |
| 7,089,310 B1 | 8/2006 | Ellerman et al. | |
| 7,103,003 B2 | 9/2006 | Brueckheimer et al. | |
| 7,103,171 B1 | 9/2006 | Annadata et al. | |
| 7,106,844 B1 | 9/2006 | Holland | |
| 7,111,163 B1 | 9/2006 | Haney | |
| 7,140,004 B1 | 11/2006 | Kunins et al. | |
| 7,143,039 B1 | 11/2006 | Stifelman et al. | |
| 7,197,331 B2 | 3/2007 | Anastasakos et al. | |
| 7,197,461 B1 | 3/2007 | Eberle et al. | |
| 7,197,462 B2 | 3/2007 | Takagi et al. | |
| 7,197,544 B2 | 3/2007 | Wang et al. | |
| 7,225,232 B2 | 5/2007 | Elberse | |
| 7,227,849 B1 | 6/2007 | Raesaenen | |
| 7,260,208 B2 | 8/2007 | Cavalcanti | |
| 7,266,181 B1 | 9/2007 | Zirngibl et al. | |
| 7,269,557 B1 | 9/2007 | Bailey et al. | |
| 7,272,212 B2 | 9/2007 | Eberle et al. | |
| 7,272,564 B2 | 9/2007 | Phillips et al. | |
| 7,277,851 B1 | 10/2007 | Henton | |
| 7,283,515 B2 | 10/2007 | Fowler | |
| 7,286,521 B1 | 10/2007 | Jackson et al. | |
| 7,287,248 B1 | 10/2007 | Adeeb | |
| 7,289,453 B2 | 10/2007 | Riedel et al. | |
| 7,296,739 B1 | 11/2007 | Mo et al. | |
| 7,298,732 B2 | 11/2007 | Cho | |
| 7,308,085 B2 | 12/2007 | Weissman | |
| 7,308,408 B1 | 12/2007 | Stifelman et al. | |
| 7,324,633 B2 | 1/2008 | Gao et al. | |
| 7,324,942 B1 | 1/2008 | Mahowald et al. | |
| 7,330,463 B1 | 2/2008 | Bradd et al. | |
| 7,330,890 B1 | 2/2008 | Partovi et al. | |
| 7,340,040 B1 | 3/2008 | Saylor et al. | |
| 7,349,714 B2 | 3/2008 | Lee et al. | |
| 7,369,865 B2 | 5/2008 | Gabriel et al. | |
| 7,376,223 B2 | 5/2008 | Taylor et al. | |
| 7,376,586 B1 | 5/2008 | Partovi et al. | |
| 7,376,740 B1 | 5/2008 | Porter et al. | |
| 7,412,525 B2 | 8/2008 | Cafarella et al. | |
| 7,428,302 B2 | 9/2008 | Zirngibl et al. | |
| 7,440,898 B1 | 10/2008 | Eberle et al. | |
| 7,447,299 B1 | 11/2008 | Partovi et al. | |
| 7,454,459 B1 | 11/2008 | Kapoor et al. | |
| 7,457,397 B1 | 11/2008 | Saylor et al. | |
| 7,486,780 B2 | 2/2009 | Zirngibl et al. | |
| 7,496,054 B2 | 2/2009 | Taylor | |
| 7,500,249 B2 | 3/2009 | Kampe et al. | |
| 7,505,951 B2 | 3/2009 | Thompson et al. | |
| 7,519,359 B2 | 4/2009 | Chiarulli et al. | |
| 7,522,711 B1 | 4/2009 | Stein et al. | |
| 7,536,454 B2 | 5/2009 | Balasuriya | |
| 7,552,054 B1 | 6/2009 | Stifelman et al. | |
| 7,571,226 B1 | 8/2009 | Partovi et al. | |
| 7,613,287 B1 | 11/2009 | Stifelman et al. | |
| 7,623,648 B1 | 11/2009 | Oppenheim et al. | |
| 7,630,900 B1 | 12/2009 | Strom | |
| 7,631,310 B1 | 12/2009 | Henzinger | |
| 7,644,000 B1 | 1/2010 | Strom | |
| 7,657,433 B1 | 2/2010 | Chang | |
| 7,657,434 B2 | 2/2010 | Thompson et al. | |
| 7,668,157 B2 | 2/2010 | Weintraub et al. | |
| 7,672,295 B1 | 3/2010 | Andhare et al. | |
| 7,675,857 B1 | 3/2010 | Chesson | |
| 7,676,221 B2 | 3/2010 | Roundtree et al. | |
| 7,715,547 B2 | 5/2010 | Ibbotson et al. | |
| 7,779,065 B2 | 8/2010 | Gupta et al. | |
| 7,882,253 B2 | 2/2011 | Pardo-Castellote et al. | |
| 7,920,866 B2 | 4/2011 | Bosch et al. | |
| 7,926,099 B1 | 4/2011 | Chakravarty et al. | |
| 7,936,867 B1 | 5/2011 | Hill et al. | |
| 7,962,644 B1 | 6/2011 | Ezerzer et al. | |
| 7,979,555 B2 | 7/2011 | Rothstein et al. | |
| 8,023,425 B2 | 9/2011 | Raleigh | |
| 8,081,958 B2 | 12/2011 | Soederstroem et al. | |
| 8,103,725 B2 | 1/2012 | Gupta et al. | |
| 8,126,128 B1 | 2/2012 | Hicks, III et al. | |
| 8,149,716 B2 * | 4/2012 | Ramanathan et al. | 370/238 |
| 8,150,918 B1 | 4/2012 | Edelman et al. | |
| 8,233,611 B1 | 7/2012 | Zettner | |
| 8,243,889 B2 | 8/2012 | Taylor et al. | |
| 8,266,327 B2 | 9/2012 | Kumar et al. | |
| 8,295,272 B2 | 10/2012 | Boni et al. | |
| 8,306,021 B2 | 11/2012 | Lawson et al. | |
| 8,326,805 B1 | 12/2012 | Arous et al. | |
| 8,346,630 B1 | 1/2013 | McKeown | |
| 8,355,394 B2 | 1/2013 | Taylor et al. | |
| 8,462,670 B2 | 6/2013 | Chien et al. | |
| 8,509,068 B2 | 8/2013 | Begall et al. | |
| 8,532,686 B2 | 9/2013 | Schmidt et al. | |
| 8,542,805 B2 | 9/2013 | Agranovsky et al. | |

(56) References Cited

U.S. PATENT DOCUMENTS

| | | |
|---|---|---|
| 8,611,338 B2 | 12/2013 | Lawson et al. |
| 8,649,268 B2 | 2/2014 | Lawson et al. |
| 8,675,493 B2 * | 3/2014 | Buddhikot et al. ........... 370/238 |
| 8,755,376 B2 | 6/2014 | Lawson et al. |
| 8,837,465 B2 | 9/2014 | Lawson et al. |
| 8,838,707 B2 | 9/2014 | Lawson et al. |
| 2001/0043684 A1 | 11/2001 | Guedalia et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2003/0006137 A1 | 1/2003 | Wei et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0165569 A1 | 8/2004 | Sweatman et al. |
| 2004/0172482 A1 | 9/2004 | Weissman et al. |
| 2004/0213400 A1 | 10/2004 | Golitsin et al. |
| 2004/0218748 A1 | 11/2004 | Fisher |
| 2005/0010483 A1 | 1/2005 | Ling |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0128961 A1 | 6/2005 | Miloslavsky et al. |
| 2005/0135578 A1 | 6/2005 | Ress et al. |
| 2005/0147088 A1 | 7/2005 | Bao et al. |
| 2005/0177635 A1 | 8/2005 | Schmidt et al. |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2006/0008073 A1 | 1/2006 | Yoshizawa et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | Mcqueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0208862 A1 | 9/2007 | Fox et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2007/0295803 A1 | 12/2007 | Levine et al. |
| 2008/0025320 A1 | 1/2008 | Bangalore et al. |
| 2008/0037715 A1 | 2/2008 | Prozeniuk et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0209050 A1 | 8/2008 | Li |
| 2008/0222656 A1 | 9/2008 | Lyman |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0313318 A1 | 12/2008 | Vermeulen et al. |
| 2008/0317222 A1 | 12/2008 | Griggs et al. |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0235349 A1 | 9/2009 | Lai et al. |
| 2009/0252159 A1 | 10/2009 | Lawson et al. |
| 2009/0288165 A1 | 11/2009 | Qiu et al. |
| 2009/0316687 A1 | 12/2009 | Kruppa |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |

(56) References Cited

U.S. PATENT DOCUMENTS

| | | |
|---|---|---|
| 2011/0029882 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0096673 A1 | 4/2011 | Stevenson et al. |
| 2011/0110366 A1 | 5/2011 | Moore et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0255675 A1 | 10/2011 | Jasper et al. |
| 2011/0265172 A1 | 10/2011 | Sharma et al. |
| 2011/0267985 A1 | 11/2011 | Wilkinson et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0320449 A1 | 12/2011 | Gudlavenkatasiva |
| 2011/0320550 A1 | 12/2011 | Lawson et al. |
| 2012/0017222 A1 | 1/2012 | May |
| 2012/0036574 A1 | 2/2012 | Heithcock et al. |
| 2012/0039202 A1 | 2/2012 | Song |
| 2012/0114112 A1 | 5/2012 | Rauschenberger et al. |
| 2012/0149404 A1 | 6/2012 | Beattie et al. |
| 2012/0173610 A1 | 7/2012 | Bleau et al. |
| 2012/0198004 A1 | 8/2012 | Watte |
| 2012/0201238 A1 | 8/2012 | Lawson et al. |
| 2012/0226579 A1 | 9/2012 | Ha et al. |
| 2012/0239757 A1 | 9/2012 | Firstenberg et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0316809 A1 | 12/2012 | Egolf et al. |
| 2013/0058262 A1 | 3/2013 | Parreira |
| 2013/0156024 A1 | 6/2013 | Burg |
| 2013/0244632 A1 | 9/2013 | Spence et al. |
| 2014/0064467 A1 | 3/2014 | Lawson et al. |
| 2014/0106704 A1 | 4/2014 | Cooke et al. |
| 2014/0153565 A1 | 6/2014 | Lawson et al. |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

\* cited by examiner

——— Traversed
━━━ Consideration pool
------ Untraversed route edge pool

SYSTEM AND METHOD FOR IMPROVING ROUTING IN A DISTRIBUTED COMMUNICATION PLATFORM

CROSS-REFERENCE TO RELATED APPLICATIONS

This application claims the benefit of U.S. Provisional Application Ser. No. 61/791,800, filed on 15 Mar. 2013, which is incorporated in its entirety by this reference.

TECHNICAL FIELD

This invention relates generally to the communication field, and more specifically to a new and useful system and method for improving routing in a distributed communication platform in the communication field.

BACKGROUND

In communication, different communication paths will have different characteristics. Not only can these characteristics result in a wide range of communication properties such as from media quality and latency. Additionally, the resources involved in routing a communication can constantly change. Resources can fail, new resources can be added, and operating properties of a resource could change. Further more there are functionality, technical, and business related restrictions on establishing a communication. Thus, there is a need in the communication field to create a new and useful system and method for improving routing in a distributed communication platform. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Method for Routing Communication

Figure 1:
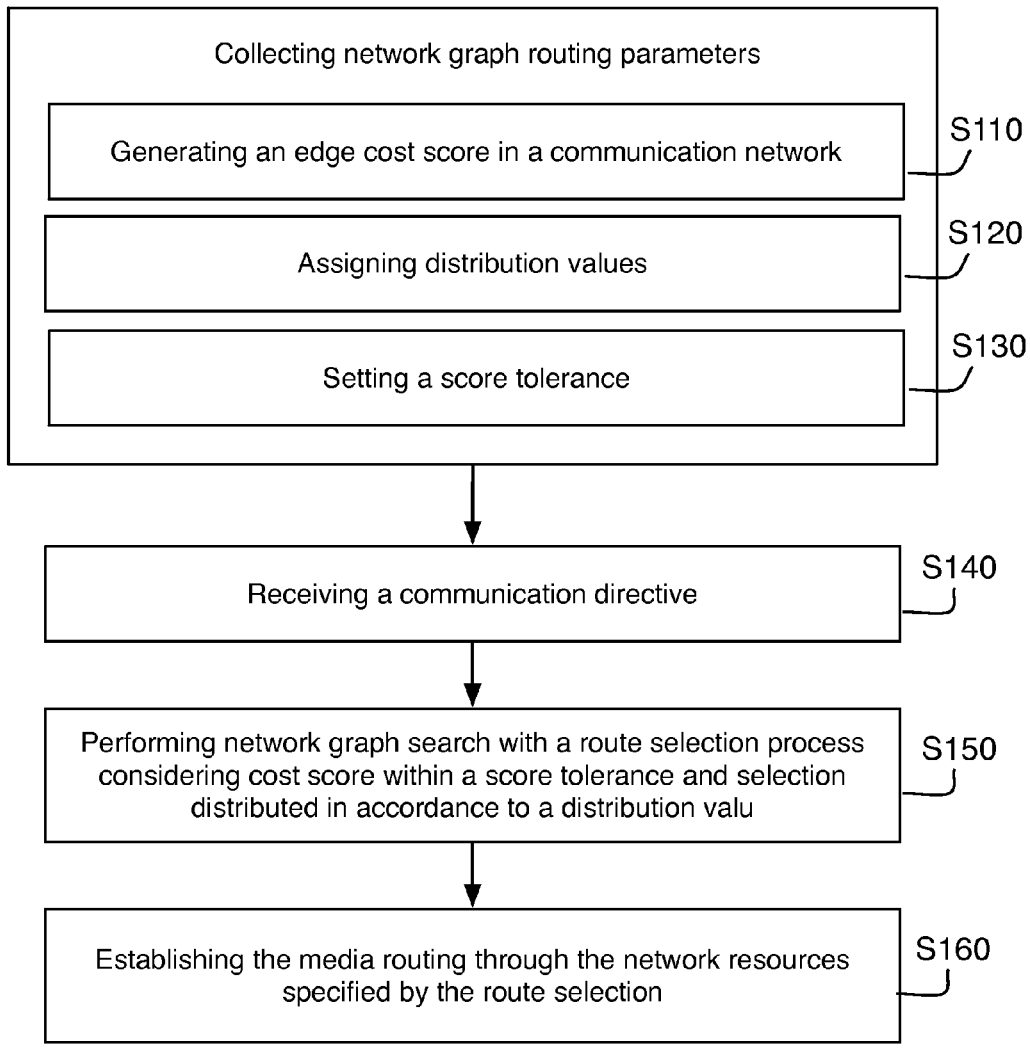
FIG. 1 is a flowchart representation of a method of a preferred embodiment.

As shown in FIG. 1, a method for achieving prioritized communication routing in a communication platform can include generating an edge cost score in a communication network S110, assigning distribution values S120, setting a score tolerance S130, receiving a communication directive S140, performing network graph search with a route selection process considering cost score within a score tolerance and distributing selection in accordance to a distribution value S150, and establishing the media routing through the network resources specified by the route selection S160. The method functions to dynamically select routing within a communication provider platform to achieve a set of communication property prioritizations. The method preferably uses cost scores of a route within a network of possible nodes to provide an initial metric to evaluate routes. The cost score can be set through a function embodying consideration and prioritization of the qualities of a communication (e.g., media quality, cost, latency, etc.). In communication applications, calls of nearly the same quality are preferably similar enough to be deemed equivalent, and the score tolerance applies this insight to create a consideration pool of routes with substantially similar scores. The distribution values are then applied to determine how one particular communication is distributed in considering that a volume of traffic will be using the communication platform.

The method can be particularly applicable to communication platforms that operate on a distributed computing infrastructure, and, more specifically, in communication platforms that facilitate additional media or signaling functionality. For example, a communication platform may provide media functionality such as recording, transcription services, conferencing, application processing and other suitable communication functionality such as those provided in the communication platform described in U.S. Pat. No. 8,306,021 issued 6 Nov. 2012, which is incorporated in its entirety by this reference.

The method is preferably employed to establish a communication path between two endpoints where the path reflects the routing prioritization while also balancing resources of the network with other routing requests. The best route (i.e., a preferred route in consideration of multiple factors) can be automatically detected and used in routing. Such routing can be invoked when an error occurs to route around a failed node, to determine routes in complex routing scenarios (e.g., a phone number in Brazil is calling a number in Spain but a required resource is only available in the US or Asia), other suitable scenarios. The method can preferably balance a number of technical considerations, business considerations, and user considerations without depending on pre-set heuristics. The method also takes into account that there will be additional traffic in addition to the immediate request, and traffic can be distributed across multiple routes. For example, a VoIP provider can use the system to provide substantially high quality media communication while balancing the contractual obligations to route a set portion of traffic through particular carrier nodes.

The method can have further beneficial application in other scenarios. In one case the communication platform may include multiple modes of communication, PSTN, SIP, WebRTC, client application (e.g., VoIP application, mobile application, browser application, etc), or other suitable mode that can be available to a particular endpoint. Such complicating factors can additionally be seamlessly integrated so that the method can be applied to situations where multiple forms of communication are available. In the case of client applications, a client application could connect to multiple datacenters to open up multiple access nodes to open up more routing options for that particular client application endpoint For example if a client application happens to be in Central America and dials a US number then the best route is preferably one with a leg connected to a US region. However, if the client application dials another endpoint in Rio, then the leg that is established may use the node connected through a Sao Paolo data center. Such automatic flexibility is preferably a benefit of such a routing method.

The method is preferably applied to establishing routing of a media channel but may alternatively or additionally be applied to routing of signaling or any suitable communication channel. More specifically, the method can be applied to SIP based media routing within a VoIP-based communication platform. Herein, SIP is described as a preferred signaling and media protocol, but any suitable signaling, media, or form of communication channel can be used. The VoIP provider even though it internally uses Sip can preferably interface with other forms of communication such as PSTN. The medium of communication can be voice, video, screen sharing, multi-media streaming, IP based data transfers, and/or any suitable medium of communication. In one preferred variation, the method can be used to dynamically select a routing profile to use at least two different routing preferences depending on the particular communication session.

Block S110, which includes generating edge cost scores in a communication network, functions to establish the base scoring of the network of a provider. The provider is preferably a VoIP provider with a plurality of edge nodes and a plurality of internal nodes. The internal nodes are preferably media-related processing nodes such as such as application nodes, transcoding resources, recording resources, simple pass through routers, quality of service enforcement nodes, speech recognition resources, text-to-speech resources, media mixers, and other suitable media resource nodes. An edge cost score is preferably a measure of an assigned cost to route from one node to a second node. The cost score can be an integer value, a number within a range of values, a classification, or any suitable value that can be used as a metric of comparison when applying the selection algorithm to generate a determined route. The cost scores of connected legs are preferably combinable either through some mathematical operation (e.g., summing) or function. The internal network of the communication platform up to and preferably including nodes that bridge out of the network are preferably scored. In some variations, not all edges (or "routes") may have an assigned edge cost and a default cost may be used.

The network is preferably defined within at least one layer of a communication stack for a communication platform. In one example, the set of network nodes preferably includes more application layer defined computing nodes that provide high level signaling and media functionality such as routing, recording, business logic, conferencing, and other higher level media functionality. In another example, the nodes can be defined as different regional centers such that the method is used when routing between computing resources of the regional center. Other layers may employ routing approaches independent of the prioritized routing approach. For example, lower level IP based routing can use alternative routing approach within the nodes, while the method of routing is used for routing between the nodes. A substantial portion of the nodes preferably will be assigned an edge cost score. Alternatively, only the edges selected or pre-defined may have an edge cost score. For example, outbound edges between the communication network and an external resource (e.g., a carrier network) may be the most significant routing decisions and will be those that are considered in the method. If an edge is new or for any suitable reason has not had an edge cost assigned, a default edge cost, an average edge cost, a manually assigned edge cost, an edge cost from a substantially similar edge, or any suitably generated edge cost may be used.

Figure 2:
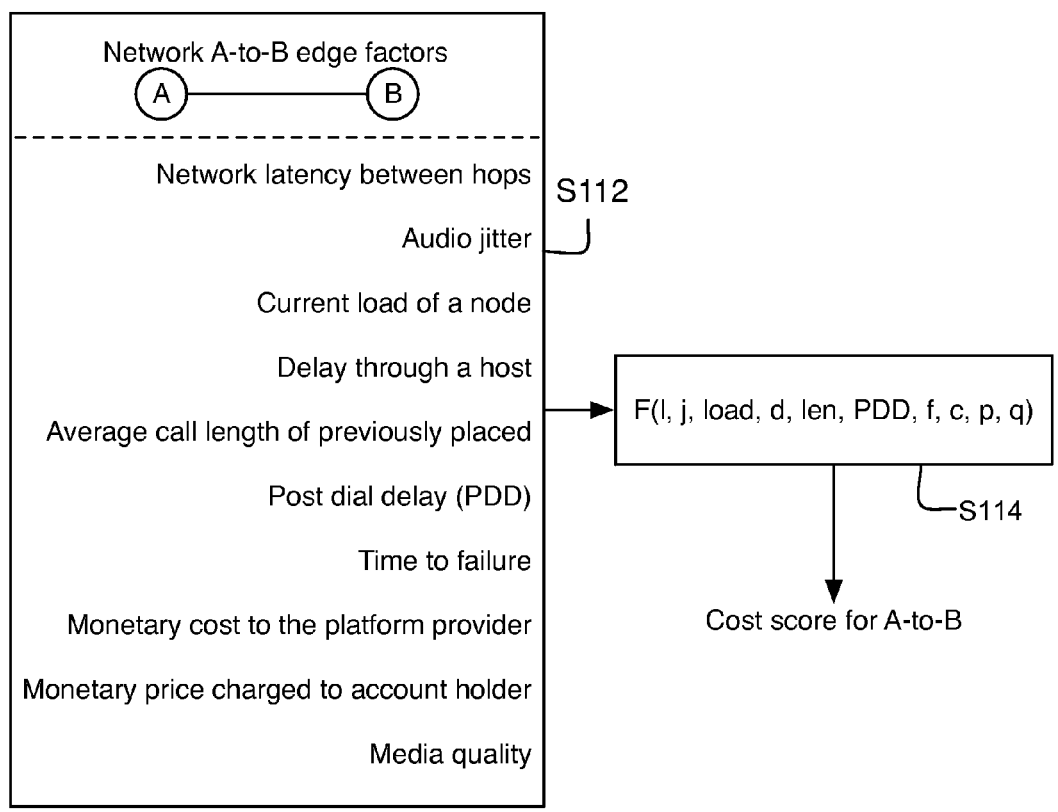
FIG. 2 is a schematic representation of variations of generating edge cost scores in the communication network.

Generating an edge cost across all or a substantial portion of the communication network may include simulating communication network traffic with an at least partially defined route. Simulated communication functions to collect data for at least one edge of the communication. When simulating communication network traffic, at least one edge is pre-selected to be used during the communication. If a new machine is deployed to the communication network, communication traffic may be initially simulated to establish the initial cost score. As shown in FIG. 2, generating edge cost scores can include collecting network factors S112 and calculating at least one score S114. Edge costs are preferably continually updated according to current, recent, or past performance of the communication platform. In one variation, edge costs are periodically updated. For example, edge costs may be updated daily, weekly, or quarterly. In another variation, edge costs may be continuously updated such that the edge cost score of selecting an edge from a first node to a second node reflects current or substantially recent cost score.

Block S112, which includes collecting network factors, functions to obtain input data to compute a cost score for direct paths between nodes. The network factors can includes various properties, performance patterns, assigned values, measurements, and/or any suitable metric. In a communication platform the communication factors can include network latency between hops, audio/media jitter (the interval delay as defined by RFC3550), current load of a node, delay through a host, delay through a host, average call length of previously placed call (e.g., length of calls through a particular carrier to a particular number series), packet loss, post dial delay (PDD) (i.e., time for carrier to indicate the other side is ringing), time to failure (i.e., time it took for a carrier to fail a call), monetary cost to the platform provider, monetary price charged to account holder, media quality, and/or any suitable factor. The factors can be metrics measured in different dimensions. Network latency, audio jitter, delay through a host, average call length, PDD, and time to failure can be measured as a time metric (e.g., milliseconds). Current load of a node can be measured in percentage of capacity. Monetary cost and price can be measured in a currency value. Media quality may be an arbitrary measurement scale.

Figure 3:
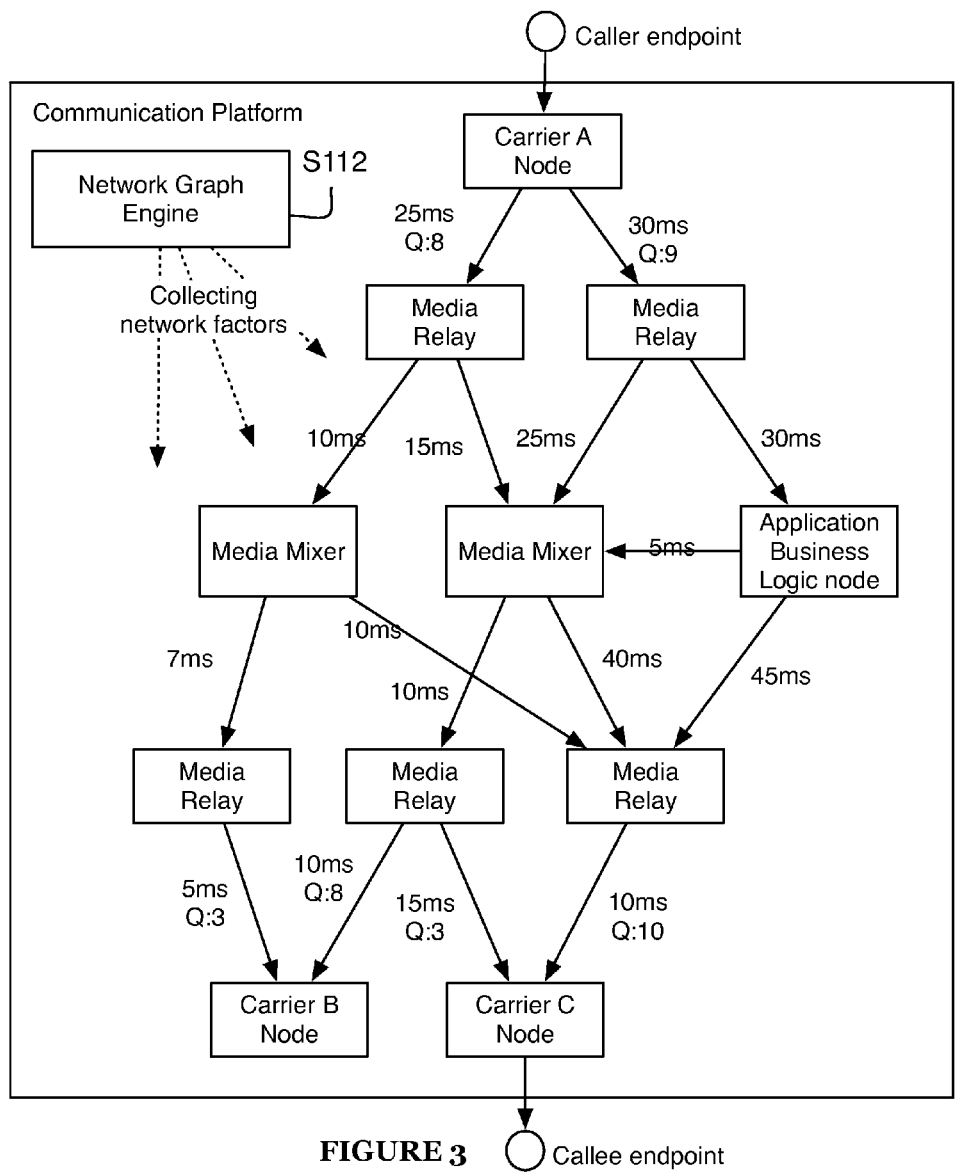
FIG. 3 is a schematic detailed representation of collecting network factors.

One or more factor can be collected for use in calculating the cost score as shown in FIG. 3. Some factors, such as audio jitter, and PDD, can require monitoring the network, measuring performance over multiple instances, and assigning a value based on the measured performance. Other factors can be configured as values that are static or assigned through another service. For example, the cost can be queried from a cost and pricing service used in managing billing within the communication platform. Other factors are substantially real time measurements such as the current load of a node. The factors can be collected and stored in an accessible resource. In one variation, an application programming interface is established to facilitate interaction with the network factors.

Block S114, which includes calculating cost scores, functions to synthesize the collected network factors into a single cost score for a routing option along an edge. For each edge, a function is applied to the factors to result in a single cost estimate. However, not all factors may be measured in the same dimension, have the same scale, or even units. The function is preferably set according to heuristics that prioritize different factors. For example, factors that impact final audio quality may be used within the function to result in a proportionally greater impact on the final cost score than factors with less prioritization such as possible price. In one variation, the function is a fixed function pre-configured in the communication platform. In another variation, the function may be machine learned or automatically optimized according to feedback.

As one example function, the cost function can depend on the total latency between two nodes (latency and host delay) and the jitter. In this example, the function may be designed to result in a target cost value if the total latency is less than 200 ms and the jitter is less than 10 ms, which are exemplary settings for acceptable performance. The function may designed so that if jitter is above 10 ms then the resulting cost goes up exponentially and if total latency exceeds 200 ms the resulting cost goes up exponentially. The cost function can be customized for any suitable response to input factors.

Figure 4:
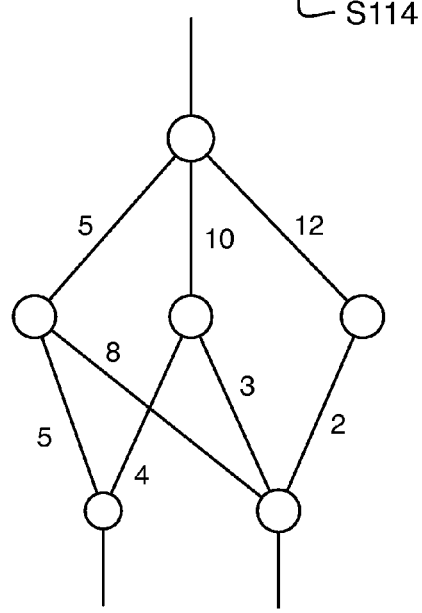
FIG. 4 is a schematic representation of application of two different routing profiles.
Figure 4:
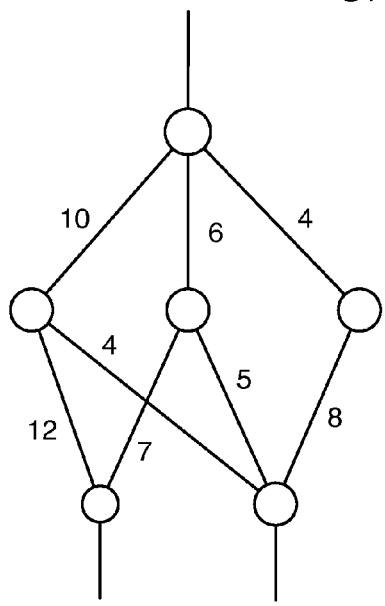

As described more below, there can be multiple routing profile classes as shown in FIG. 4. A routing profile class preferably uses one particular function to calculate a cost score. In the implementation where there are at least two routing profile classes, the network factors can be used in possibly calculating two cost scores. Routing profile classes are preferably designed for particular prioritization of properties. The routing profile classes may be price-prioritized (e.g., select routes cheaper for the customer), cost-prioritized (e.g., select routes cheaper to the platform provider), quality-prioritization, stability-prioritization, and/or any suitable prioritization of some quality of the communication.

Block S120, which includes assigning distribution values, functions to define proportioning of distribution between selected routes. The distribution values can include a set of values. The distribution values are preferably applied/used after the routes have been narrowed based on cost and the score tolerance. The distribution values may be assigned to an edge, to a node, or to specific route. The distribution values are preferably pre-configured to be assigned within the route—a distributed value or values can be obtained for any suitable route. In some cases a route may not have an explicitly assigned distribution value, in which case a default value may be used. Preferably, the distributed values are assigned according to external factors around preference for how traffic is distributed across multiple equivalent routes. In the variation, where the distribution value is assigned to an edge and/or a node, a calculated route distributed value(s) is preferably calculated through the processing of the elemental distributed values of edges and/or nodes contained in a route. For example, a weight value may be assigned to two edges. The resulting weight value of a route that passes through those two edges may be the sum of the weights. Similarly, the weights could be the average or any suitable calculated result. In another variation, the distributed values are assigned on a per route basis, the full set of possible routes may be calculated and a weight assigned to each possible route. Such a system may employ sparse over-ride assignment or any suitable defining approach.

In one preferred variation, the distribution values include a weight. A weight is preferably a value defined to indicate preference of how often one path should be selected over other possible paths. The weights function to distribute communication over multiple routes in some determined ratio for a set of similar traffic. As described below, the weight value is applied in selecting between routes that are determined equivalent through the cost score and the score tolerance. For two routes (with the same cost score), the route with a weight of 80 will be selected 80% of the time if the other route has a weight of 20, which would be selected 20% of the time. Weight values that are the same are preferably deemed equal preference. For two routes with the same cost score have weights of 35, they each would be selected half the time.

In another, preferred variation, the distribution values can additionally include a priority value. The priority values can be similarly assigned to an edge and a default value may be assumed if a value is not assigned. The priority value preferably defines classes of preference between equivalent routes. They can be used to narrow the consideration pool. Routes assigned the same priority value are considered for selection as a group. In the case of a telecommunication platform, there may be top tier network carriers, middle-tier carriers, and bottom tier carriers. The nodes routing to these carriers can be assigned priority according to those three classes so that if there is a top tier carrier node, then middle or bottom tier options are not considered. The value of the priority value may use a greater value to indicate stronger preference such that priority values can be added across edges in a route. Alternatively, the priority values may use smaller values to indicate greater priority. The priority values can be an initial layer of distribution, and the weighted distribution can be applied afterwards. Other variations may apply any suitable distribution value to define how route selection is distributed between "equivalent" routes (after considering score tolerance).

Priority and weighting can function to enable external factors to be considered when determining network routing. In the case of a communication platform with supporting nodes that serve particular carriers, there will often be business arrangements, partnerships, contracts, and other obligations that create an obligation or an incentive to use particular nodes. For example, one phone carrier may establish a contract with the communication platform dictating that some minimum volume of traffic will be serviced by the carrier node. Another phone carrier may offer similar performance in terms of the cost score, but if no contract is place or the conditions of the contract are less restrictive, the first carrier node may result in corresponding routes to be more greatly weighted than the second carrier node. Other factors, such as resource limitations, technical tradeoffs, and other considerations of different nodes or routes may additionally or alternatively be considered when assigning a weight.

Block S130, which includes setting a score tolerance, functions to establish a range of "fuzziness". The score tolerance is preferably a value that defines when cost scores should be considered equivalent—defines the range that cost scores can deviate and be considered for selection. In execution, if two routes through a network have similar cost scores, the effective performance may be substantially similar and accordingly the method preferably treats the cost scores as equivalent. When used in performing the network graph search, the score tolerance is preferably applied to the lowest cost score (i.e., best cost score). The score tolerance is preferably added to the lowest cost score, and the (inclusive or exclusive) range sets what cost scores deemed equivalent. For example, if the best route based on the cost score is 10 and the score tolerance is set to a value of 2 then another route with a score of 11 is considered but a route with a score of 15 is not. Herein, lower scores are the better routes based on the cost function but alternative implementations may use a higher score to indicate a better route or a score closer to a target value, the route selection deviation range can be applied in any suitable way to establish a fuzziness in distinguishing between cost scores that are near the same value. The score tolerance is preferably a fixed value, but the score tolerance may be a defined as a sliding scale, a function of score tolerance, or a probabilistic module of tolerance, or any suitable function to determine a range of values to consider.

Figure 5:
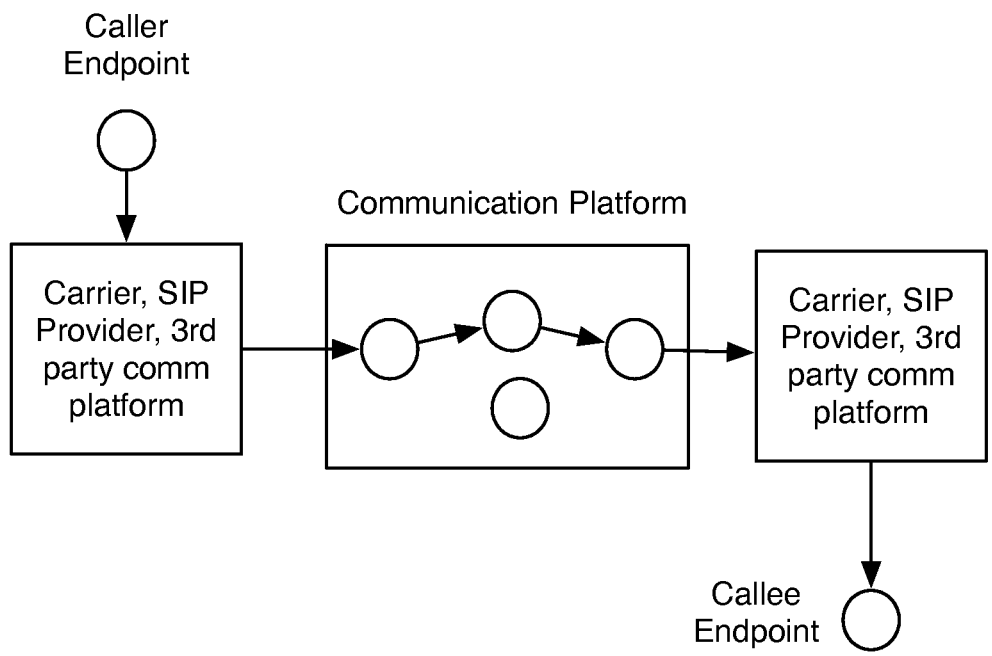
FIG. 5 is a schematic representation of receiving an incoming communication request.
Figure 6:
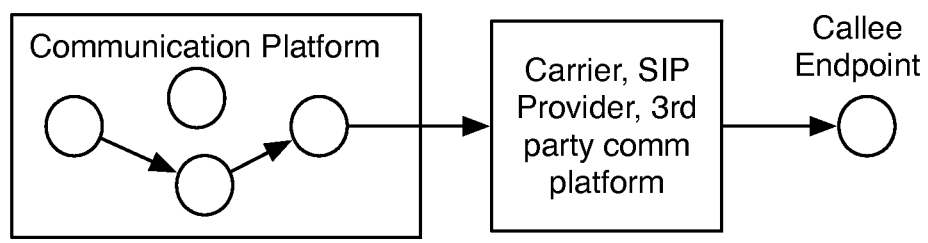
FIG. 6 is a schematic representation of initializing an outgoing communication in response to a programmatic request.
Figure 7:
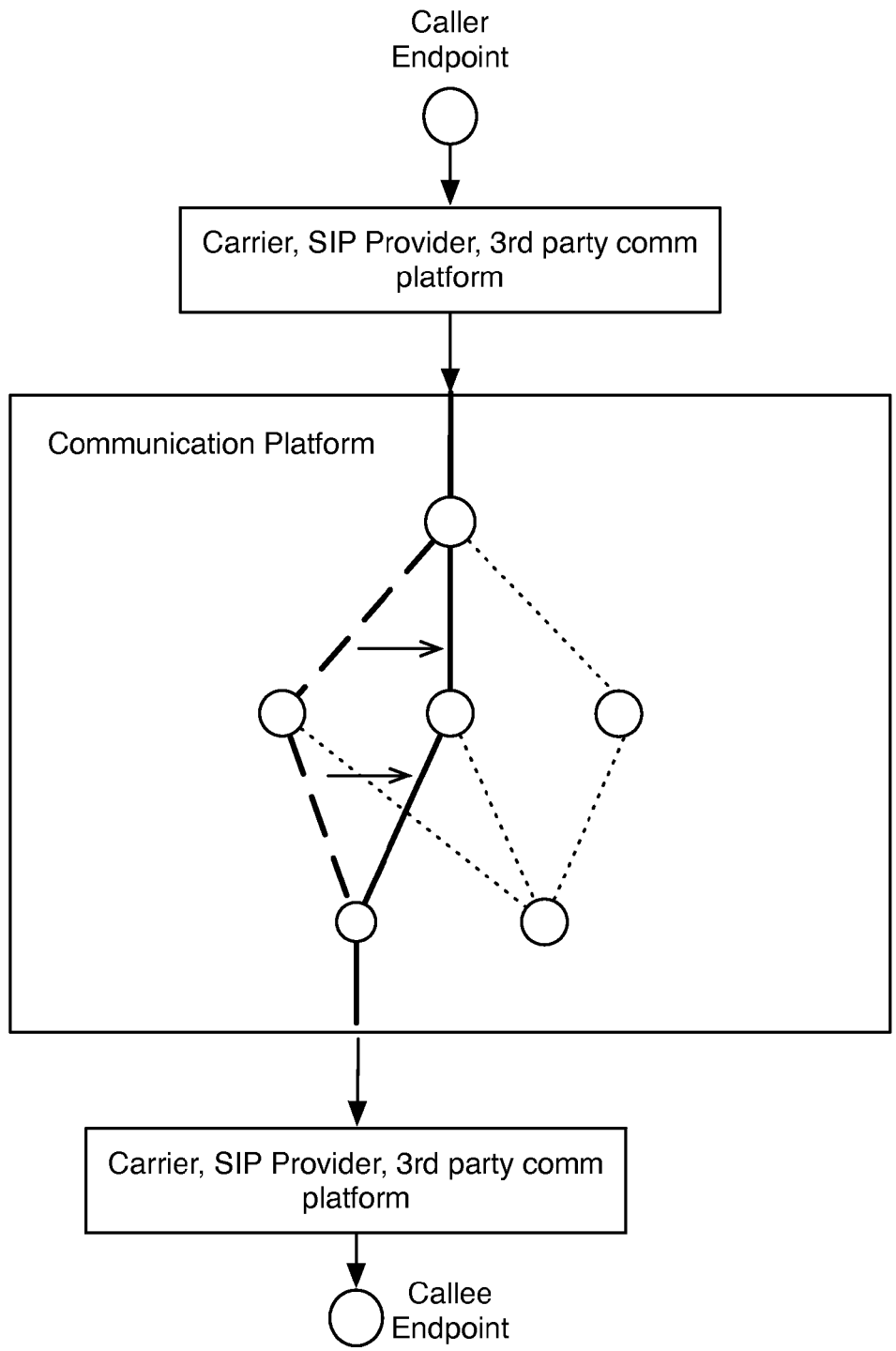
FIG. 7 is a schematic representation of receiving a communication directive to transition communication routing.

Block S140, which includes receiving a communication directive, functions to trigger establishing, upgrading, or otherwise setup communication routing through the network of the communication platform. In one variation receiving a communication directive specifies establishing a new communication session and accordingly occurs at the beginning of a session. As shown in FIG. 5, when starting a new session, initializing a communication session can include receiving an incoming communication request. The incoming communication request can be a PSTN phone call received through a carrier interface, a SIP call, an IP based call, or any suitable form of communication. The incoming communication request can originate from an originating endpoint (i.e., a caller). As shown in FIG. 6, as another alternative, when starting a new session, initializing a communication session can include initializing an outgoing communication in response to a programmatic request. The communication request may enable a communication session to originate from within the communication session. For example, an automated call application may call out to a phone number to play an automated message. The programmatic request may be in response to an application programming interface (API) request made by an account holder or triggered in any suitable manner. As shown in FIG. 7, in another variation, receiving a communication directive occurs during a communication session and can result in a transition or change in resource requirements of an existing session. Such a communication directive (i.e., an update communication directive) can be used to enable a media service during a session. The communication directive preferably triggers the routing of media or signaling or other form of communication through the network of the communication platform. In the case of routing media, the method can include issuing or processing signaling communication through the network, which can function to prepare and setup media routing. In some cases, the communication directive is communicated to a control node, which may contain business logic to determine how the media communication should be routed.

Figure 8:
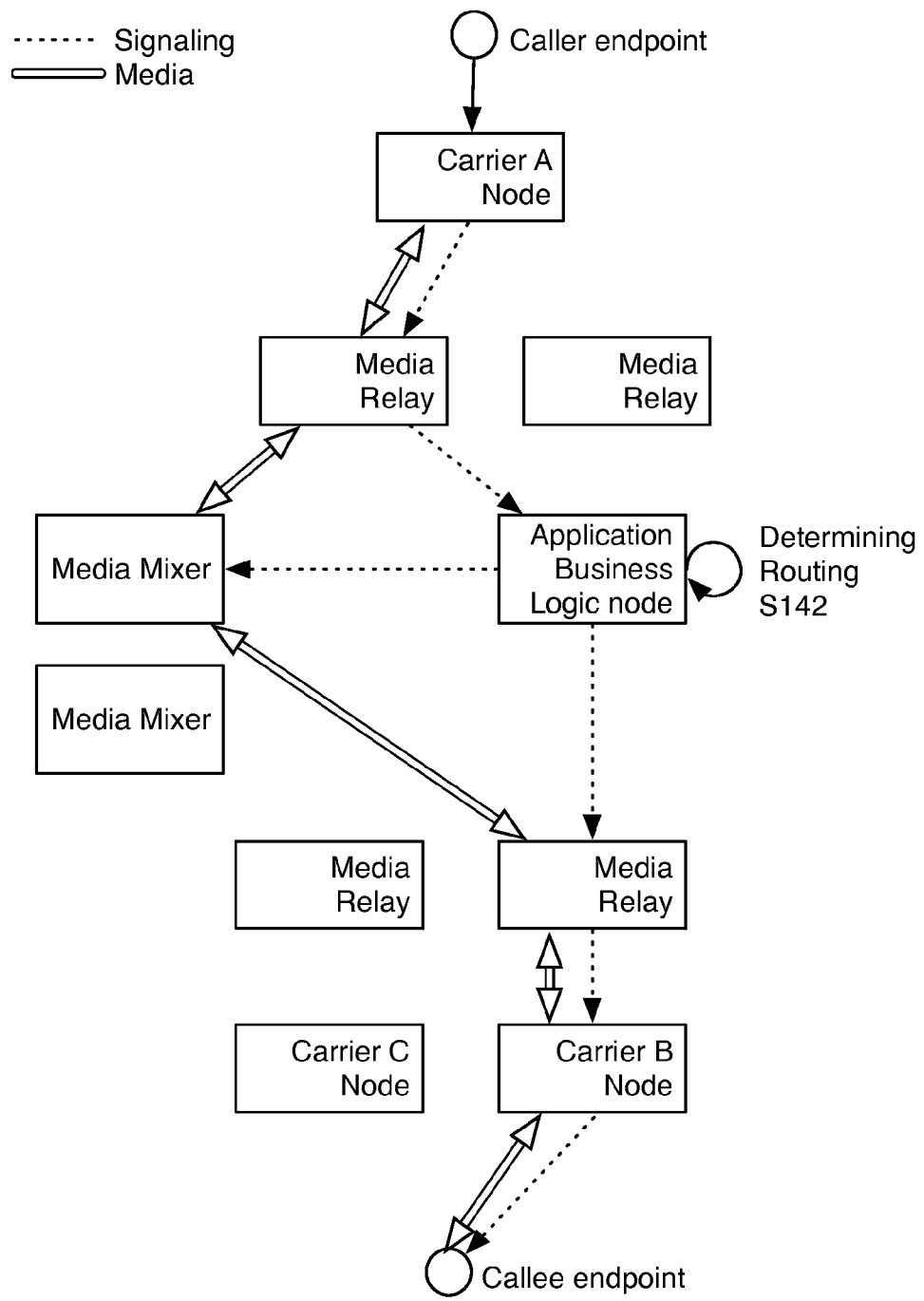
FIG. 8 is a schematic representation of determining functional media communication resources to support the communication session.

In addition to receiving a communication directive, the method can include determining functional media communication resources to support the communication session S142, which functions to select the types of nodes, sequencing/organization of the types nodes, and/or basic topology of the network routing to support the communication session. For example, as shown in FIG. 8, a media mixer resource may be required to support a conference call feature of a communication session. Other media resources may include a recording service, a transcription service, an application processing service, or any suitable type of resource. If the communication directive is to start a SIP trunking call, a simple trunking application service may be required to bridge between two endpoints. If the communication directive triggers recording of the communication session, the media routing may be internally updated in accordance with the method to include a recording resource. As the method can similarly be applied to signaling communication and other types of communication, determination of communication resources and a basic network topology can similarly be applied to computing resources that facilitate signaling or provide other suitable functionality. Similarly, some nodes may be marked as mandatory for the selected route. If an existing communication session is being updated to accommodate media resource changes, some media sources may not be able to be changed in the middle of a communication session. For example, a media recorder resource may not be able to change because recording is in progress. The network graph search can preferably be modified to enforce any node requirements or exclusion policies.

Block S150, which includes performing network graph search with a route selection process that includes considering cost score within a score tolerance, and distributing selection in accordance to a distribution value, functions to use defined distribution values such as weights and/or prioritization when selecting between substantially equivalent routes for serving a particular instance of communication routing. The network graph search preferably considers multiple factors to adequately determine a route, path or at least a portion of a routing for communication. The network graph problem in one scenario, as shown in FIG. 5, can resolve the routing problem of routing from one outlet of the communication platform, through the communication platform to another outlet. This can be particularly applicable when the computing infrastructure is geographically distributed and is sensitive to latency and media communication quality. Carriers and selection of carriers can be one strong consideration in routing, since selection of a carrier may impact, media quality and/or cost.

In another scenario, performing network graph search can solve routing from one internal node of the communication platform to an outlet of a communication platform as shown in FIG. 6. For example, the communication may require running an automated call from one media resource to an outside telephony endpoint. Similarly, the communication may be from one internal node to another internal node. Performing graph search with at least one internal node as a destination or source can be used in defining the full communication route or only a portion of the communication route if for example an internal node is bridging at least two legs.

Figure 9:
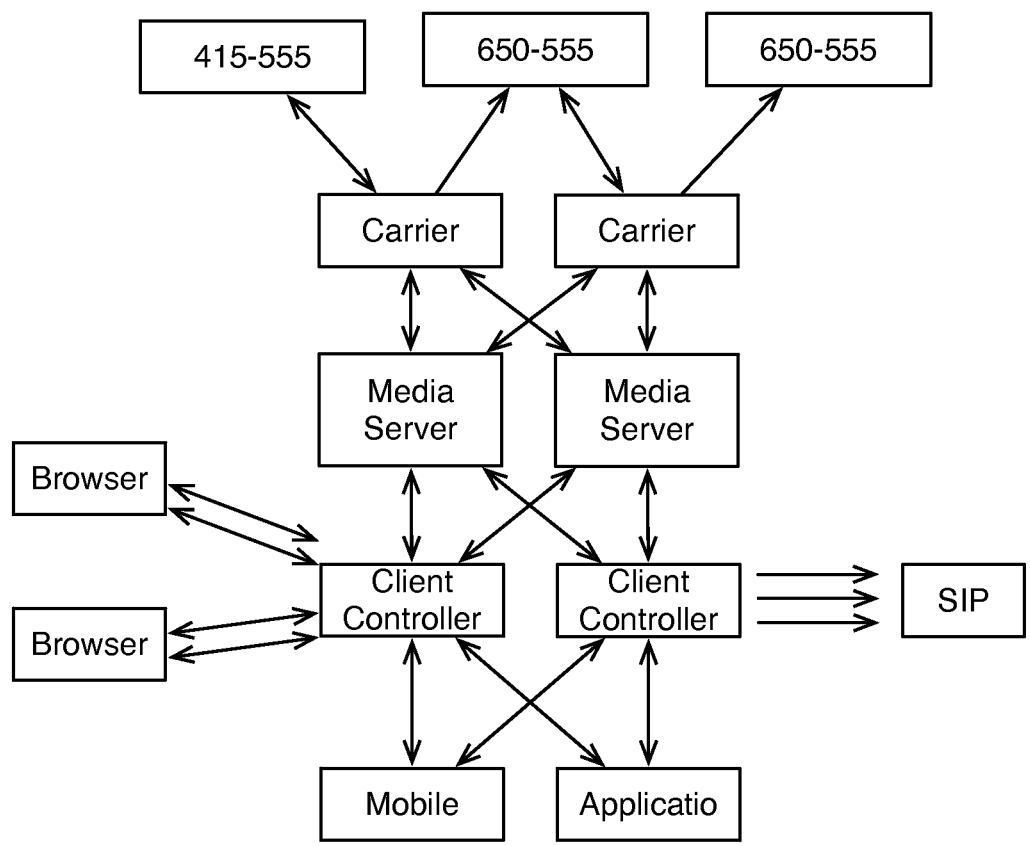
FIG. 9 is a schematic representation of an exemplary network topology.

Additionally, a communication route may have defined intermediary nodes, which can have a defined network graph sequence and/or topology. As shown in FIG. 9, a communication application platform may have a defined set of media resources that should be integrated into the media and/or signaling of a communication session. The required media resources can be fixed, but the media resources for a given instance of communication may be dynamically determined based on the requirements of a call. For example, one call may require a media recording resource, while another call may require a conferencing media resource. Functionality defined media resource requirements can additionally include preference between suitable media resource options. For example, there may exist an audio recording resource and a video recording resource, which may both, be suitable for audio recording but the more light-weight audio recording resource may be a preferred resource. The network graph search can preferably enforce inclusion of any suitable resource and factor in resource node preference.

Figure 10:
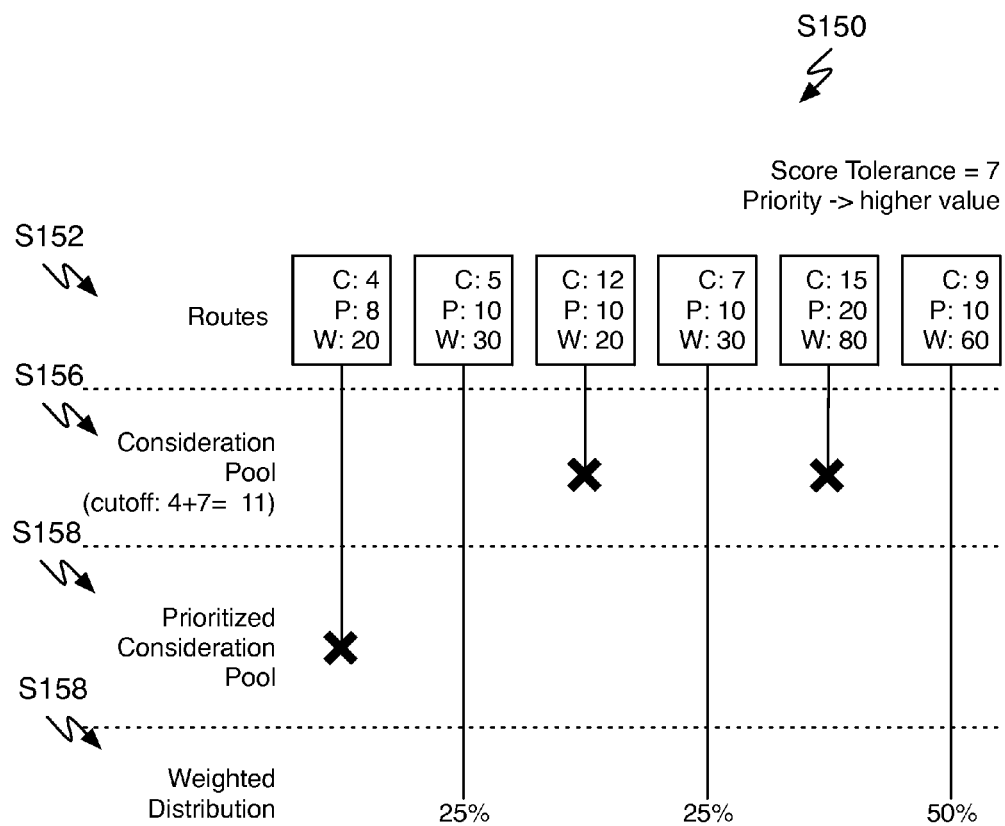
FIGS. 10 and 11 are schematic representations of performing network graph search.
Figure 11:
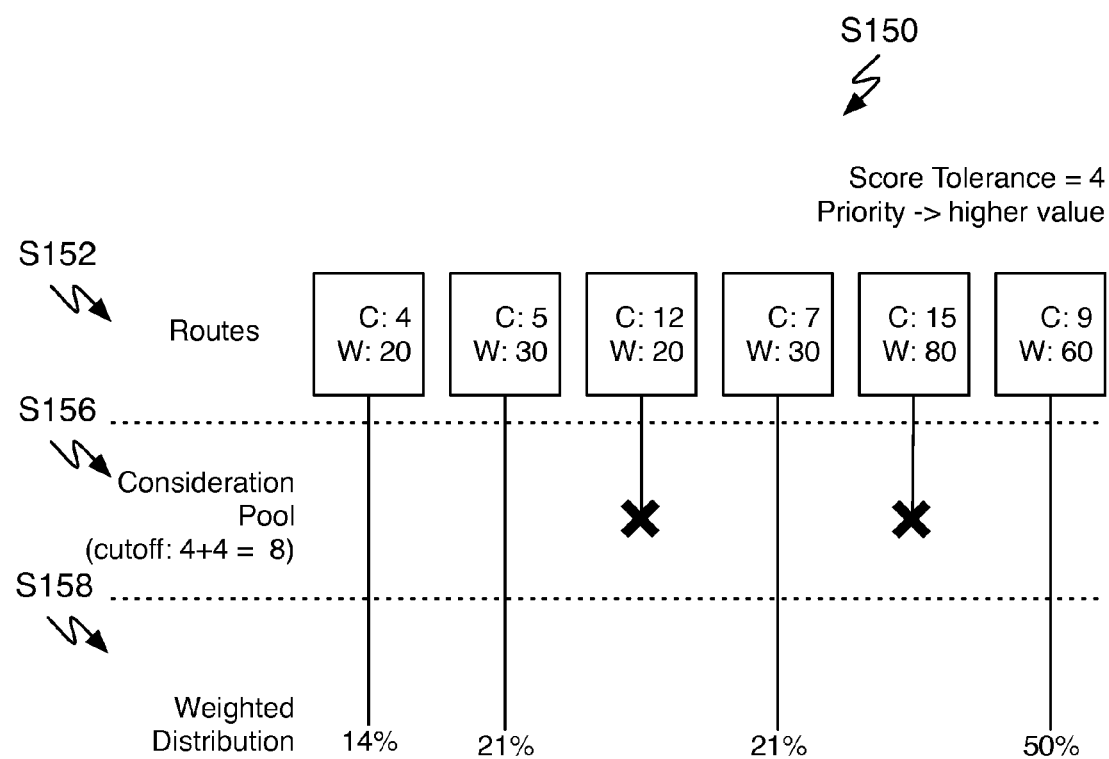

Performing network graph search preferably includes applying the selection process of: identifying a lowest cost route according to the total cost score of each route from a set S152, setting a consideration pool to routes with cost scores within a range tolerance of the identified lowest cost route S156, and selecting a route based on at least one distribution values of the routes in the consideration pool S158. In one variation, the distribution value of the route includes a weight value, which defines a distribution of communications over those set of considered routes as shown in FIG. 10. In another variation, the routes can additionally include a priority value which can classify and limit the consideration pool based on definite preference between the options, and if multiple routes remain applying weight values in the distribution between the filtered consideration pool as shown in FIG. 11. The lowest cost route additionally preferably satisfies resource node requirements and/or topology.

Figure 12:
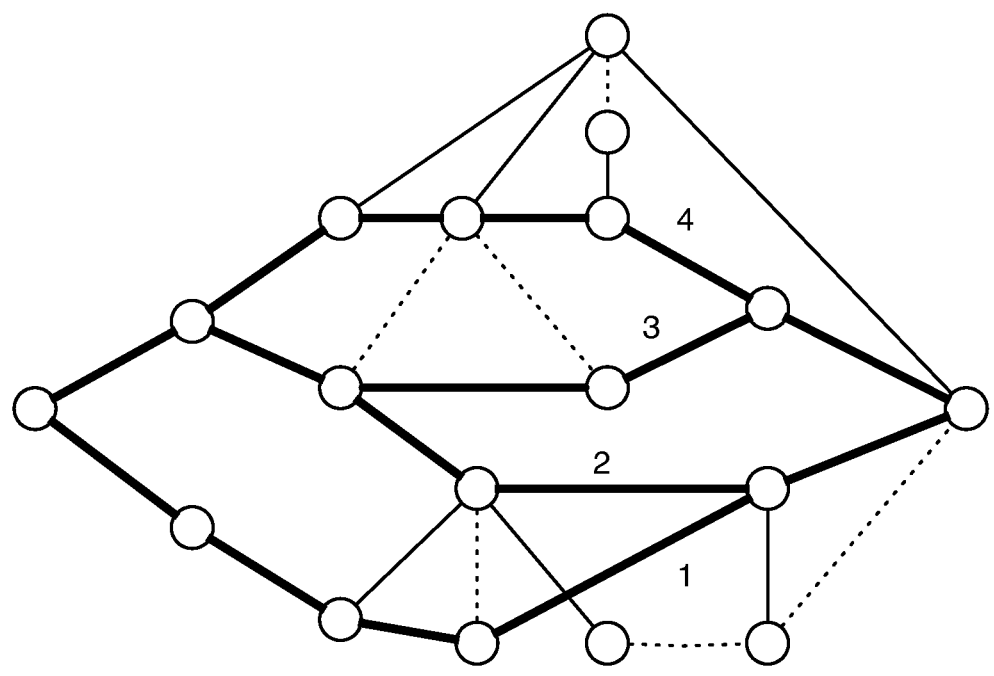
FIG. 12 is a schematic representation of traversing a network graph.

Performing network graph search preferably includes traversing the network graph to identify at least one route according to the cost score S154. Traversing the network graph functions to inspect the route options of the network between at least a source node and a goal node. The method preferably depends on consideration of a set of suitable routes and accordingly operates with a modified form of graph search. Traversing the network graph preferably identifies the best score in addition to at least the routes within the score tolerance as shown in FIG. 12. The traversal approach can use any suitable heuristic to improve the graph search. The traversal approach preferably employs a graph traversal approach similar to the A* (i.e., "A star") traversal heuristic. The A* traversal heuristic preferably uses a best-first traversal approach that follows a route of the lowest cost, while keeping a sorted priority queue of alternate routes along the way. Alternative traversal heuristic patterns can similarly be applied such as a Dijkstra-based traversal, a depth-first search, a breadth-first search, and/or any suitable graph traversal approach. Additionally any suitable optimization such as pre-processing route cost or other improvements can be applied.

The traversal heuristics are preferably augmented to accommodate modified consideration pool of routes and performing network graph search preferably includes setting a consideration pool to routes with cost scores within a range defined by the score tolerance S156. The consideration pool is preferably a collection or set of routes that are considered equivalent to the best route according to cost. The score tolerance is preferably a range determined by adding a discrete value to the best route cost. Alternatively, the range may be a probabilistic distribution of equivalency to the best routing option. The distribution can additionally contribute to the distribution values described below. In this case, each route may be included in the consideration pool but the probability of selection for use goes down with the distance from the best route score. In one variation, the network traversal algorithm can be modified to accommodate for cost score equivalence and optionally distribution values. In one variation, performing network graph search preferably includes traversing the network graph in identifying a least cost route while factoring in a score tolerance of the costs. This can be performed in any suitable approach while traversing the network graph. In one variation, performing a best-first traversal approach can traverse the best route, and once one is found traversing all routes that are and remain within the score tolerance. In other variations, the score tolerance can be considered while traversing the network graph.

Performing a network graph search additionally includes selecting a route based on a distribution values of the routes in the pool S158, which functions to allow communication to be shared amongst routes that are substantially equivalent as defined by the score tolerance. The distribution value is preferably the sum of the edge distribution values along a route. Alternatively, the distribution of a route can be the maximum value, the minimum value, the average value, the median value, or any suitable value calculated from the individual edge or node associated distribution values. As mentioned above, in a telecommunications application, weights are preferably assigned to different carrier nodes, which determine which external partner is engaged when establishing communication outside the communication platform. Such external entities can have related business contracts that dictate how much traffic should be terminated or serviced through them by the network. Such carrier node preference can be embodied in the relative distribution values. Additionally or alternatively, distribution values can be applied to place preference to use (or not use) particular resources within the route.

In one preferred implementation the distribution value includes a weight. The weigh value is preferably a value that indicates the target distribution of communication through a consideration pool of routes. Selecting a route preferably substantially promotes a distribution between the routes in the consideration pool to be in proportion to the weights. The proportion is approximated over total or eventual traffic. The weighting preferably functions to achieve some balancing across a set of substantially equivalent routing options. As a basic example, if the consideration pool of routes includes a route A with a weight of 80 and a route B with a weight of 20 then 80% of communication with the same parameters (e.g., same start and end destinations) will go through route A and 20% through route B. The weights are preferably normalized across the considered routes. For example a route C with a weight of 100 was also considered in that pool, then traffic would be distributed as 40% route A, 10% route B, and 50% route C. When distributing traffic, the selection can be applied randomly with the weighted distribution, may be made in round-robin/alternating fashion according to distribution, or in any suitable manner.

In another preferred implementation, the distribution value of a route can include a priority and a weight. The priority value preferably defines an additional mechanism through which distribution can be controlled. Priority can add an additional filter where only routes of the highest level of priority in the consideration pool are considered. Priority is preferably evaluated based on the highest priority value such that priorities of multiple edges in a route can be summed and used as a route prioritization. Alternatively, the greatest priority value (whether communicated in a larger or lesser value) within any given edge of a route can be use. Any suitable approach can be used to define the route prioritization. Applying the prioritization value preferably results in a prioritized consideration pool. For example, if a consideration pool includes route A with priority 5, route B with priority 3, and route C with priority 5, then route A and C are in the prioritized consideration pool. After the priority is used to select the top priority equivalent routes, weight values can be used to distribute the communication in manner similar to above. Other distribution heuristics may alternatively or additionally be applied such as including a fuzziness of prioritization, using a continuation distribution function, or any suitable approach to impact distribution.

Block S160, which includes establishing the media routing through the network resources specified between the originating endpoint and the destination endpoint, functions to use the route selected in accordance to performing the network graph search. The media is preferably routed through the selected resources and communication is established. In the case, where the method is applied to other forms of communication such as signaling, then the communication is executed over the selected route in the corresponding mode. In the case of a VoIP provider, establishing the media routing can include negotiating and performing any suitable form of handshaking through signaling to setup the media communication channel. If the communication is a new communication, the communication is established for the first time for that communication session. If the communication session existed previously, but was modified (e.g., to include new required media resources), then the signaling preferably handles removing/unsubscribing un-used resources and inviting new resources to modify the previous route to conform to the newly selected route. The method is preferably applied in distributed computing infrastructures. A distributed infrastructure can include multiple datacenters or regions. The different regions can be separated by geographically significant distance (e.g., greater than 1000 miles or 2000 miles). As the communication platform can include these different regions, the media routing can included routing between the different regions.

The method can additionally include selecting a cost function according to a routing profile S170, which functions to allow the cost function to vary between communication instances on the communication platform. In implementation, the use of different route profiles can allow two communication requests within the platform to use different cost score functions within block S114 as shown in FIG. 4. There is preferably a route profile for each type of cost score function provided in the system. The function of one account profile can emphasize media quality, another may minimize price, another may minimize cost, another may be a balance between quality and price, others can prioritize a particular type of performance, or provide any suitable valuation of the cost score. As an example, the method preferably includes at least two routing profiles—a first routing profile class is a price-prioritized routing profile and a second routing profile class is a communication quality-prioritized routing profile.

In one variation, the type of routing profile is determined by account settings. An account within a multitenant communication platform can pre-configure the account to use one type of account profile. For example, one account may set the account to use best media quality, another account may want to minimize price, and an account using a free trial may be forced into an account profile that prioritizes lower cost to the platform.

In another variation, the type of routing profile is specified for the current communication session, which functions to allow the preference to be set on a call-by-call basis. The account profile can additionally be updated during a communication session. For example, a marketing application may make thousands of calls using lowest cost routing profile, and after a caller picks up and engages with the marketing representative, the routing profile can be updated to a media quality routing profile when updating the routing.

In yet another variation, a routing profile class can alternatively be set based on the type of communication (e.g., video uses quality-prioritized scores, voice uses price-prioritized scores). Other variations may enable a function to be customized by an administrator, account holder, or any suitable entity.

2. Example Scenarios

Figure 13:
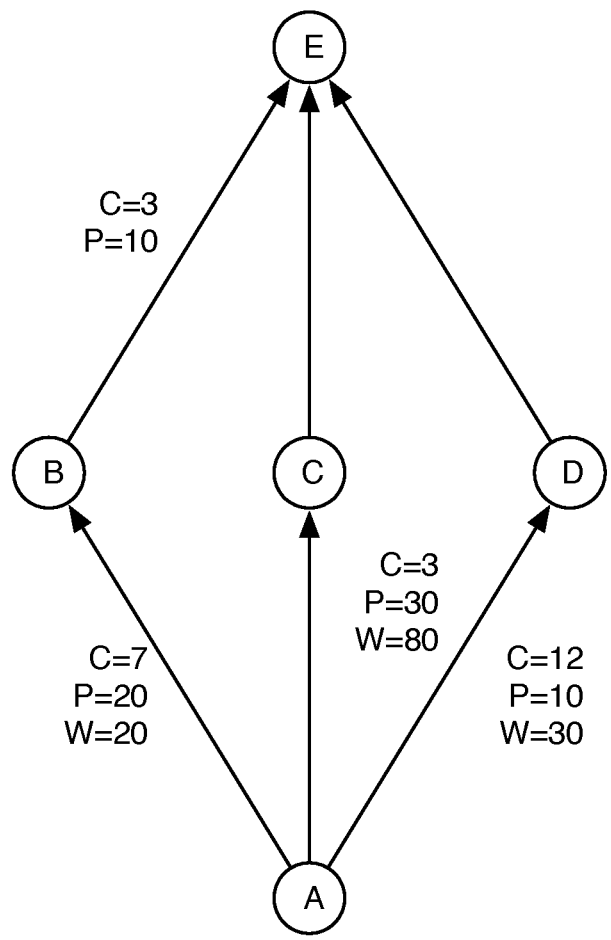
FIG. 13 is an exemplary network graph.

In one exemplary scenario of applying the method can involve a network, as shown in FIG. 13, which includes a route A-D-E with a cost-priority-weight characterization of 12, 10, and 30 (respectively); a route A-C-E with a cost-priority weight characterization of 3, 30, and 80; and a route A-B-E with a cost-priority-weight characterization of 10, 30, and 20. The cost-priority-weight characterizations are preferably set through summing the values along the route. Route A-C-E has the lowest cost of 3. If a cost tolerance of 10 is used then all costs are within the cost tolerance, and all routes are in the consideration pool. As a result the route through D is considered equivalent to the route through C. Since routes A-C-E and A-B-E have the same priority, the weight value is used to distribute traffic between them such that 80% of traffic goes over A-C-E and 20% goes over A-B-E.

If the distribution step does not consider the priority value and only applies weighting within the consideration pool, then the traffic will be distributed across all three routes with a distribution proportion of approximately A-D-E 23%, A-C-E 62%, and A-B-E 15%. If the cost tolerance is 3, then A-D-E is the only route in the consideration pool and all traffic is distributed to that route. As shown in this example, cost takes precedence. The route with the lowest cost is selected over a path with a higher cost. However, costs that are "close enough" are considered equal in order to allow for some "fuzziness" of the cost tolerance. And finally, paths with greatest priority value receive traffic distribution corresponding to normalized weight ratios.

Figure 14:
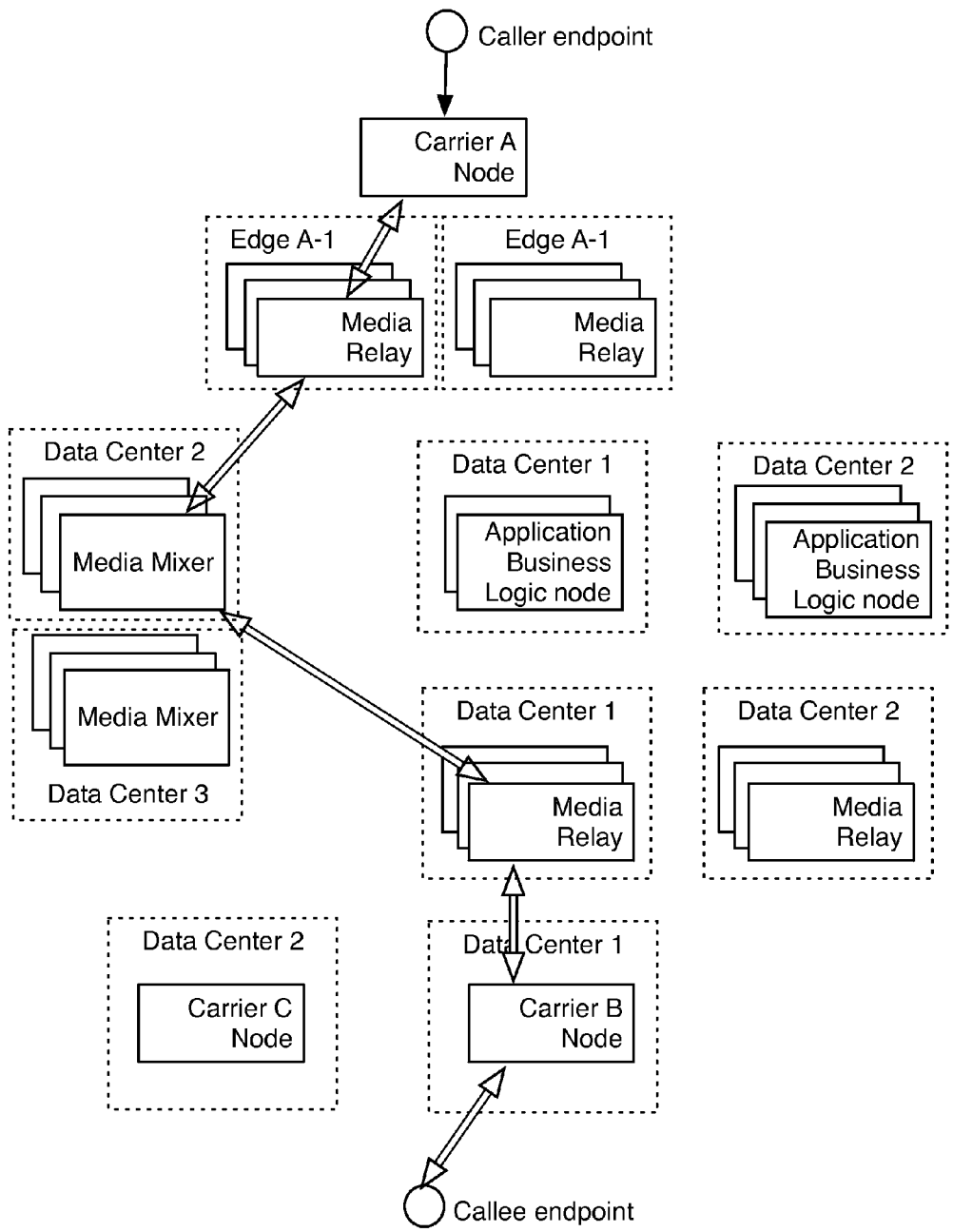
FIG. 14 is a schematic representation of establishing communication routing between regionally distributed data centers.

As one exemplary use within a VoIP provider, an inbound call may be received and signaled through different nodes of the VoIP provider as shown in FIG. 8. The VoIP provider can include a media gateway at the edge of the network among other numerous media resources such as transcoding, recording, simple pass through routers, quality of service enforcement, speech recognition, text-to-speech, mixing, and other suitable media resource nodes. In this example, a call comes into the VoIP provider network through a carrier A. Resources of the provider will send the signaling (via SIP or some other suitable signaling protocol) to a pre-configured or dynamically selected destination which may be a media and/or signaling relay node. The signaling is preferably moved to a business logic node (i.e., an application node) where functionality requirements and other conditional media resource considerations can be determined. In this example, the provider determines that the incoming call should be placed in a conference; the application node allocates a media mixer node as a required resource for the route. The application node may additionally determine a set of resources that have access to the intended destination to a carrier B. As the route to the particular media mixer and media relay to carrier B are selected, the method for route selection is preferably applied to determine the best route according to the configuration of the platform. The media channel is established with the nodes according to the determined route as shown in FIG. 8. In a related scenario, a similar platform may be distributed over multiple data centers as shown in FIG. 14, and the routing method enables for media to be dynamically routed through nodes that achieve the goals of the cost function while balancing external considerations such as resource prioritization and weighting.

In a related example, an in-session communication may be previously established, but business/control logic may trigger a change in the media resource requirements. For example, a recording resource may need to be added to record the message. The method can be applied with updated resource requirements to determine a new preferred route. The application logic preferably triggers reconfiguring the route to achieve the new route. Reconfiguring can include adding, removing, and updating resources. Such reconfiguring is preferably achieved through a sequence of signaling messages to the appropriate resources. Even though a media mixer was still required in the new route, the method determines that different media mixer node would provide better performance.

3. System for Routing Communication

Figure 15:
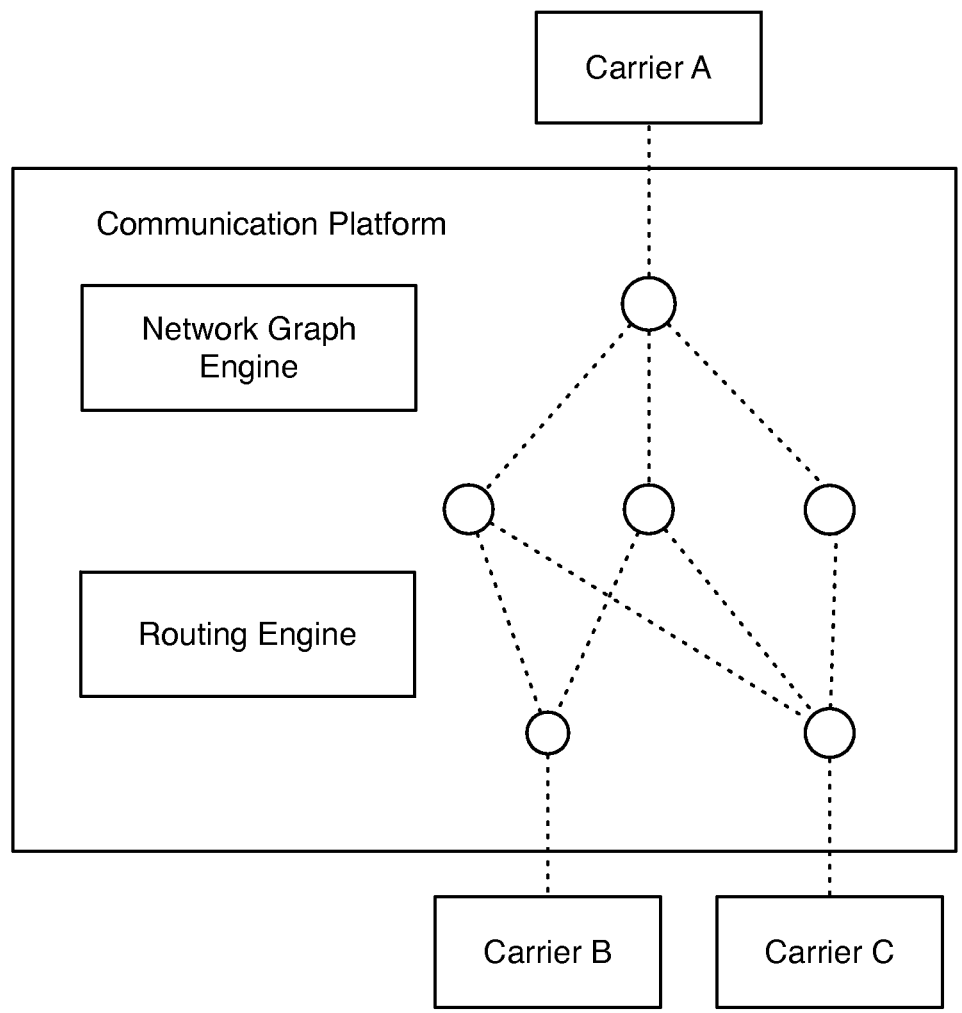
FIG. 15 is a schematic representation of a system of a preferred embodiment.
Figure 16:
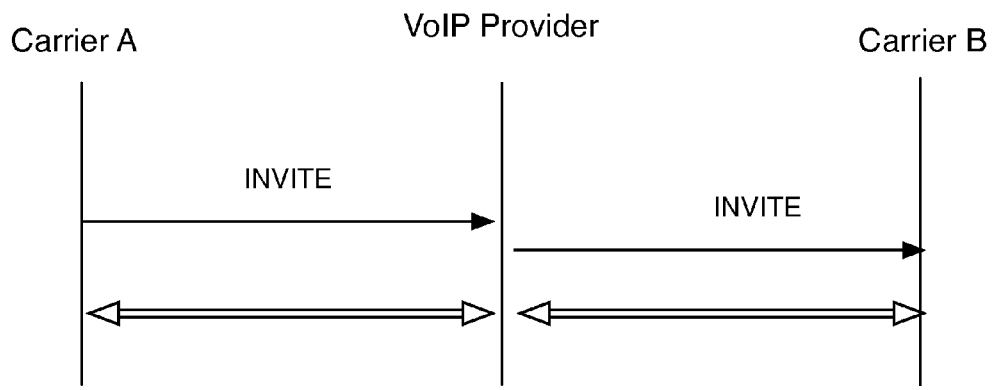
FIG. 16 is a communication flow diagram of an exemplary communication facilitated by the communication platform.
Figure 17:
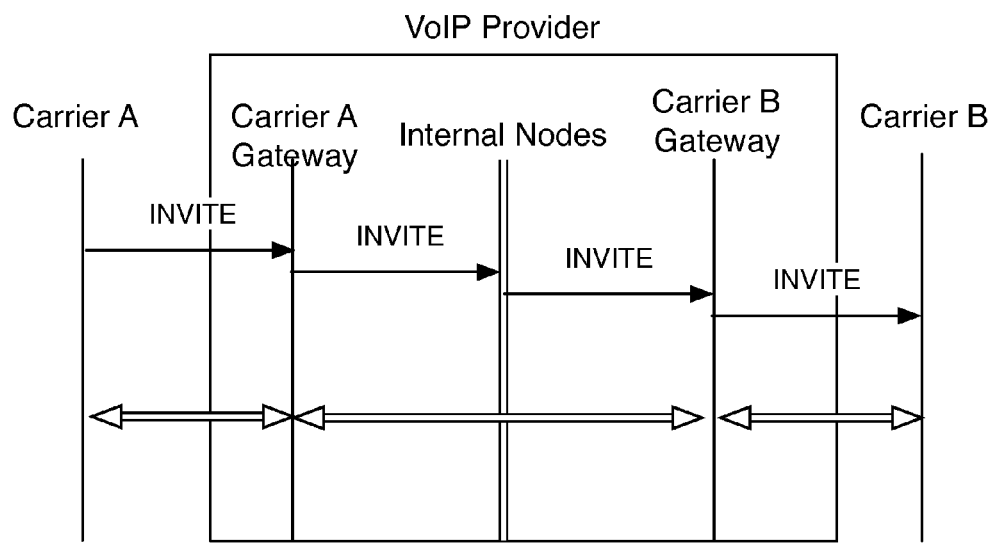
FIG. 17 is a communication flow diagram of an exemplary communication through the communication platform.

As shown in FIG. 15, a system of a preferred embodiment includes a set of communication resource nodes, a network graph engine, and routing engine. The system is preferably implemented for a telecommunication platform provider that facilitates routing of communication through or within the platform. In one preferred implementation, the communication platform is a platform of a VoIP provider. As shown in FIG. 16, the system (e.g., a VoIP provider) can facilitate communication between two endpoints, but as shown in FIG. 17, the internal routing can involve multiple resources selected from a number of possible resources. In another preferred implementation, the communication platform can be used within a communication application platform providing a various modes of interacting with a communication and facilitating communication over PSTN, SIP, SMS, MMS, client application protocols, and/or other modes of communication such as in the platform described in U.S. Pat. No. 8,306,021. The communication platform can be used for voice communication, video communication, multi-party conferencing, screen sharing, and/or any suitable form of communication.

The communication resource nodes can be any suitable nodes. Preferably the nodes are an abstracted view of the resources and the complete routing hops. For example, a host that may have multiple virtual hosts or services may be viewed as a single resource. As another example, the same type of resource within one data center may be abstracted as the same node since networking and load balancing between the resources within a datacenter may be handled in an alternative lower level approach. While the actual set of resources can vary depending on the communication platform, one preferred implementation includes carrier gateways that interface with different carrier networks. The carrier networks will additionally include different access to endpoints—a carrier gateway may only be capable of accessing a set number of endpoints. For example, a US-based carrier A may not be able to access UK-based phone numbers. Other edge gateways may include SIP-edge gateways that interface with public SIP based devise, client application protocol (e.g., different IP based applications that can act as a communication endpoint), and other suitable forms of communication.

The set of communication resource nodes can additionally include an application node that facilitates determining basic network topology of a route. The network topology preferably describes the node types required for a route, the optional nodes in a route, mandatory nodes, order/configuration of different node types, and other basic route requirements to fulfill a request. The application node preferably facilitates the selection of functionality requirements of the route and can manage establishing the route. In a basic communication such resource functionality requirements may be predefined.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the communication platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for routing a communication within a communication platform with at least a set of nodes interfacing to outside communication services comprising:
   collecting network factors of edges of a communication network;
   calculating cost scores from a cost function and the collected network factors;
   assigning distribution values within the communication network, the distribution values including at least one of a weight value and a priority value;
   setting a score tolerance for the cost scores;
   receiving a communication directive;
   performing network graph search to identify a selected route for the communication directive, the graph search comprising:
      identifying a best cost route according to the total cost score of routes in the communication network,
      setting a consideration pool to routes with cost scores within a score tolerance of the cost score of the best cost route, and
      selecting the selected route based on determined distribution values of the routes in the consideration pool; and
   establishing a media route specified by the selected route for the communication directive.

2. The method of claim 1, further comprising selecting a cost function according to a routing profile, wherein one routing profile is a price prioritized routing profile and wherein a second routing profile is a communication quality prioritized routing profile.

3. A method for routing through a communication network of a communication platform comprising:
   generating edge cost scores in the communication network;
   assigning distribution values within the communication network, the distribution values including at least one of a weight value and a priority value;
   setting a score tolerance for the cost scores;
   receiving a communication directive;
   performing network graph search to identify a selected route for the communication directive through a route selection process including considering routes with cost scores within the score tolerance and distributing selection of a route associated with the communication directive in accordance to the distribution values; and
   establishing a media route specified by the selected route for the communication directive.

4. The method of claim 3, further comprising collecting network factors, wherein the edge scores are calculated from the collected network factors that include at least media jitter and latency.

5. The method of claim 3, further processing signaling through the communication network and of a communication request and determining functional media communication resources to support a communication session.

6. The method of claim 3, wherein performing network graph search to identify a selected route comprises:
   identifying a best cost route according to the total cost score of routes in the communication network, setting a consideration pool to routes with cost scores within a score tolerance of the cost score of the best cost route, and selecting the selected route based on determined distribution values of the routes in the consideration pool.

7. The method of claim 6, wherein the distribution values are weight values; and wherein selecting the selected route based on determined distribution values of the routes in the consideration pool comprises selecting a route to substantially promote a distribution between the routes in the consideration pool to be in proportion to the weights.

8. The method of claim 7, wherein the weight of a route is assigned to a carrier node in the communication network.

9. The method of claim 7, wherein the distribution values include priority values; and wherein selecting the selected route based on distribution values of the routes in the consideration pool comprises updating the consideration pool to include only routes with the greatest priority value.

10. The method of claim 3, wherein the communication network includes nodes in at least two regional data centers; and wherein at least two regional centers are separated by a global distance of at least two thousand miles.

11. The method of claim 3, wherein generating edge cost scores in a communication network comprises collecting network factors and calculating cost scores from a cost function with network factor inputs.

12. The method of claim 11, further comprising selecting a cost function according to a routing profile.

13. The method of claim 12, wherein the selection of a routing profile is determined by account settings.

14. The method of claim 12, wherein the selection of a routing profile is specified in association with a current session of the communication directive.

15. The method of claim 12, wherein a first routing profile is a price-prioritized routing profile and wherein a second routing profile is a communication quality-prioritized routing profile.

16. The method of claim 3, wherein establishing a media route establishes at least a portion of the media communication in a session initiation protocol (SIP) based communication.

17. The method of claim 3, wherein establishing a media route establishes at the video media channel.

18. The method of claim 3, wherein establishing a media route establishes at the voice media channel.

19. The method of claim 3, wherein receiving a communication directive comprises receiving an incoming communication request.

20. The method of claim 3, wherein receiving a communication directive comprises initializing an outgoing communication in response to a programmatic request.

21. The method of claim 3, wherein receiving a communication directive occurs during a communication session; and wherein establishing a media route specified by the selected route comprises transitioning a previous media route to the selected media route.

* * * * *